US008237956B2

(12) United States Patent
Levine

(10) Patent No.: US 8,237,956 B2
(45) Date of Patent: Aug. 7, 2012

(54) COST RECOVERY SYSTEM AND METHOD FOR WALK-UP OFFICE EQUIPMENT

(75) Inventor: Mark Levine, Hampstead (CA)

(73) Assignee: Copitrak Inc., Montréal, Québec (CA)

( * ) Notice: Subject to any disclaimer, the term of this patent is extended or adjusted under 35 U.S.C. 154(b) by 1540 days.

(21) Appl. No.: 11/643,848

(22) Filed: Dec. 22, 2006

(65) Prior Publication Data

US 2007/0258112 A1 Nov. 8, 2007

Related U.S. Application Data

(60) Provisional application No. 60/796,878, filed on May 3, 2006.

(51) Int. Cl.
*H04N 1/40* (2006.01)
(52) U.S. Cl. .................. 358/1.15; 358/1.14; 358/448
(58) Field of Classification Search .................. 358/1.9, 358/1.1, 1.15, 448
See application file for complete search history.

(56) References Cited

U.S. PATENT DOCUMENTS

| | | | |
|---|---|---|---|
| 5,933,584 A | 8/1999 | Maniwa | |
| 6,025,925 A | 2/2000 | Davidson, Jr. et al. | |
| 6,026,380 A | 2/2000 | Weiler et al. | |
| 6,903,836 B2 | 6/2005 | Meade, II et al. | |
| 2001/0037311 A1 | 11/2001 | McCoy et al. | |
| 2002/0058530 A1* | 5/2002 | Akama | 455/556 |
| 2003/0137685 A1* | 7/2003 | Meade et al. | 358/1.14 |
| 2004/0003095 A1 | 1/2004 | Gitany-Alonso | |
| 2004/0093410 A1 | 5/2004 | Reddy et al. | |
| 2004/0130743 A1 | 7/2004 | Nozato | |
| 2004/0223778 A1 | 11/2004 | Zwiefelhofer | |
| 2004/0226018 A1 | 11/2004 | Motoyama et al. | |
| 2005/0005130 A1 | 1/2005 | Okigami | |
| 2005/0270571 A1 | 12/2005 | Fujitani et al. | |
| 2005/0283521 A1 | 12/2005 | Whan | |
| 2006/0017966 A1 | 1/2006 | Ormond | |
| 2006/0045245 A1 | 3/2006 | Aaron et al. | |

FOREIGN PATENT DOCUMENTS

| | | |
|---|---|---|
| EP | 1 217 509 A2 | 6/2002 |
| JP | 2003256558 | 12/2003 |
| WO | WO 2005/062661 A1 | 7/2005 |

OTHER PUBLICATIONS

Bertl—Authentication Without the Pain, http://www.bertl.com/web/news.do?id=612, Copyright 2007—MCA Internet, LLC, dba Bertl, 3 pages.

(Continued)

*Primary Examiner* — King Poon
*Assistant Examiner* — Iriana Cruz

(57) ABSTRACT

A cost recovery system for a multi-functional photocopier device. The cost recovery system comprises a plurality of workstations interconnected by a communications network, as well as a controller adapted to control the operation of the photocopier device, the controller being connected to the network. The cost recovery system further comprises at least one broker unit operative to communicate with the controller via the network, the at least one broker unit being responsive to requests to reserve the photocopier device received from users at the workstations to authenticate the users and to establish temporary cost recovery relationships between the controller and the workstations. Accordingly, a user can reserve the photocopier device from any one of is the plurality of workstations and then walk up to the photocopier device and perform a job on the photocopier device on a basis of a specific cost recovery relationship established by the at least one broker unit between the controller and the respective workstation.

17 Claims, 13 Drawing Sheets

OTHER PUBLICATIONS

PaperCut NG—Control for your network resources, http://www.papercut.biz/products/ng/, Copyright 1999-2006, PaperCut Software Pty Ltd., 3 pages.

Goprint (GS-3) Solution, GoPrint, Print Cost Recovery, Pay for Print, Print Management System, etc, http://www.goprint.com/, Copyright 2000-2005 GoPrint Systems, Inc., 2 pages.

\* cited by examiner

| User ID | Data | Time | Account | Type of Service | Service Charge |
|---------|------|------|---------|-----------------|----------------|
| ABC | Oct. 2, 2006 | 13H40 | 12156 | PH | $3.25 |
| DEF | Oct. 2, 2006 | 15H28 | 34333 | PH | $21.52 |
| GEH | Oct. 15, 2006 | 9H16 | 22265 | PH | $1.15 |
| IJK | Oct. 16, 2006 | 10H23 | 57892 | S | $8.02 |
| LMN | Oct. 16, 2006 | 15H55 | 66321 | PH | $7.45 |

| Last Jobs (1-5) |
|---|
| 01100132-0793<br>Allstate Insurance Co-chi<br>Jerome Stern Pembridge |
| 60000170-0027<br>Heritage of St. Louis<br>Labour |
| 200112770-0001<br>101 W. 23 Apt. Inc.<br>Ground Lease |
| 09754050-0027<br>Accenture Llp<br>Teaming Agreement |
| 80000330-0012<br>Adel Rootstein Limited<br>Mark Berryman - Employm |

| Auto Complete |
|---|
| Search |
| Favorites |

MARK LEVINE NETWORK
Test Search

Lawyer [▼]

Description [▼]

| Batch Setup Dialog Printed on Batch Setup |

[Batch] [Cancel]

COST RECOVERY SYSTEM AND METHOD FOR WALK-UP OFFICE EQUIPMENT

CROSS-REFERENCE TO RELATED APPLICATION

The present application claims the benefit of domestic priority from U.S. Provisional Application Ser. No. 60/796,878 filed on May 3, 2006 in the name of Mark Levine. The contents of the aforementioned document are incorporated by reference herein.

FIELD OF THE INVENTION

The present invention relates to a cost recovery system and method for walk-up office equipment, such as multi-functional photocopier devices, allowing to control, monitor and expense the usage of these devices.

BACKGROUND OF THE INVENTION

Many professional organizations have a fee schedule structured to account for a variety of disbursements incurred on behalf of clients. Photocopy charges and facsimile expenses are typical disbursements that are allocated to client accounts. Keeping a precise record of those charges is a difficult challenge because the transactions conducted on the photocopier or facsimile machine are numerous. Yet, this task is an essential one in order to avoid loss of revenue due to improper allocation of costs.

The use of cost recovery equipment is a solution adopted by many professional organizations. Under this approach, cost recovery equipment is installed within the organization in order to limit and control access to office equipment, including photocopiers, printers, facsimile machines and scanners. Typically, the cost recovery equipment requires user level authentication before a device can be used to perform a job, such as the printing or photocopying of an 80-page document. In addition to authenticating users, the cost recovery equipment can be designed to require additional information from a user before a job can be performed on a device, such as a description of the work and a client number for billing purposes.

Components of cost recovery equipment for multifunctional photocopier devices fall into one of three different categories:

1. Embedded software on the device itself;
2. External single-function hardware;
3. External multi-function hardware.

Whether the cost recovery equipment is implemented in software, hardware or both, it is always divided into two distinct functions, namely: 1) authentication and usage monitoring; and 2) device control. The portion of the cost recovery equipment that performs authentication and usage monitoring is referred to as the "Master", while the portion that actually controls operation of a device is referred to as the "Slave". Regardless of the particular design of the cost recovery equipment, there is always one Master and a minimum of one Slave controlled by the Master. In some cases, a single Master controls many Slaves.

Within a professional organization in which some implementation of cost recovery equipment controls the multi-functional photocopier devices, users can not access a particular photocopier device without first being authenticated by the Master. In order to be authenticated, users must typically present themselves at a fixed Master apparatus, which may be the particular photocopier device, some other photocopier device or a designated terminal, among other possibilities.

Over the past few years, the increased popularity and use of scanning has driven a change in the types of multi-functional photocopier devices that professional organizations are purchasing. Basically, there has been a movement away from expensive workgroup photocopier devices (each supporting 10-15 people), towards smaller personal photocopier devices (each supporting 1-4 people). Professional organizations are purchasing three to five small personal photocopier devices to replace one large workgroup photocopier device. This change in office equipment is forcing a change in the cost recovery solution marketplace. It is no longer affordable for professional organizations to buy an expensive controller for each photocopier device in order to implement a cost recovery solution.

One existing solution to the recent changes in the cost recovery marketplace is to provide hardware-free, software-based cost recovery equipment, which is less expensive for the professional organizations. The cost recovery equipment therefore consists solely of software embedded in each photocopier device. Although seemingly simple and relatively inexpensive, embedded cost recovery software for a photocopier device is a custom project that must be developed and completed jointly by a cost recovery vendor and the manufacturer of the photocopier device. Unfortunately, since photocopier devices are frequently changed, updated or upgraded, and offer little flexibility in the types of functions and features they can deliver in terms of cost recovery, the development and maintenance of the embedded software is complicated. It may also be limited in terms of the possible features that can be incorporated into the cost recovery equipment.

Another solution is the purchase of cheaper control terminals by the professional organizations. Unfortunately, unless the cost recovery vendors lower the sale prices of their terminals, cheaper terminals typically can not deliver the same feature set and productivity as the higher end terminals. Furthermore, regardless of the price of the terminals, they occupy physical space within the office space of the professional organization, which is becoming more and more rare, such that the physical presence of these control terminals is less desirable.

The background information provided above clearly indicates that there exists a need in the industry to provide an improved cost recovery system and method for walk-up office equipment, such as multi-functional photocopier devices.

SUMMARY OF THE INVENTION

According to a broad aspect, the present invention seeks to provide a cost recovery system for a multi-functional photocopier device. The cost recovery system includes a plurality of workstations interconnected by a communications network, as well as a controller adapted to control the operation of the photocopier device, the controller being connected to the network. The cost recovery system further includes at least one broker unit operative to communicate with the controller via the network, the at least one broker unit being responsive to requests to reserve the photocopier device received from users at the workstations to authenticate the users and to establish temporary cost recovery relationships between the controller and the workstations. Accordingly, a user can reserve the photocopier device from any one of the plurality of workstations via the at least one broker unit and then walk up to the photocopier device and perform a job on the photocopier device on a basis of a specific cost recovery relationship established by the at least one broker unit between the controller and the respective workstation.

According to another broad aspect, the present invention provides a computer readable storage medium containing a program element for execution by a CPU to implement a cost recovery system for a plurality of multi-functional photocopier devices, each photocopier device being associated with a controller adapted to control the operation thereof, the controllers and a plurality of workstations being interconnected by a communications network. The program element is responsive to requests to reserve one of the photocopier devices received from users at the workstations to authenticate the users and to establish temporary cost recovery relationships between the controllers and the workstations.

According to yet another broad aspect, the present invention provides a method for controlling access to a plurality of multi-functional photocopier devices, each photocopier device being associated with a controller that is adapted to control the operation thereof, the controllers being interconnected via a network with a plurality of workstations. The method includes receiving a request to reserve one of the photocopier devices from a user at any one of the workstations and submitting the user to an authentication process at the respective workstation, including prompting the user for identification information. If authentication is successful, the method further includes establishing a temporary cost recovery relationship between a particular one of the controllers and the respective workstation, whereby the user can walk up to the associated photocopier device and perform a job on the associated photocopier device on a basis of the cost recovery relationship established between the particular controller and the respective workstation.

According to a further broad aspect, the present invention provides a cost recovery server for controlling access to a multi-functional photocopier device, the cost recovery server being interconnected via a network with a plurality of workstations and a controller, the controller being adapted to control the operation of the photocopier device. The cost recovery server is responsive to a request to reserve the photocopier device received from a user at any one of the plurality of workstations to attempt to authenticate the user and, if authentication of the user is successful, to establish a temporary cost recovery relationship between the controller and the respective workstation. Accordingly, the user can walk up to the photocopier device and perform a job on the photocopier device on a basis of the cost recovery relationship established between the controller and the respective workstation.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the accompanying drawings:

FIGS. 11 to 13 illustrate various possible screens and menus of the graphical user interface displayed to a user at his/her workstation when reserving a photocopier device, according to a non-limiting example of implementation of the present invention;

DETAILED DESCRIPTION

The present invention provides a novel cost recovery system and method for walk-up office equipment, notably multi-functional photocopier machines.

For purposes of the present description, a "multi-functional photocopier machine" or "multi-functional photocopier device" is a photocopier that may perform one or more functions in addition to the traditional photocopying function, such as scanning, faxing or printing. However, the functions that are addressed and handled by the present invention, and therefore that are within the scope of the present invention, are the walk-up functions. More specifically, a "walk-up function" is a function that requires a user to walk up to the photocopier and interact with the photocopier in order to perform a job on the photocopier, such as photocopying, faxing or scanning.

Figure 1:
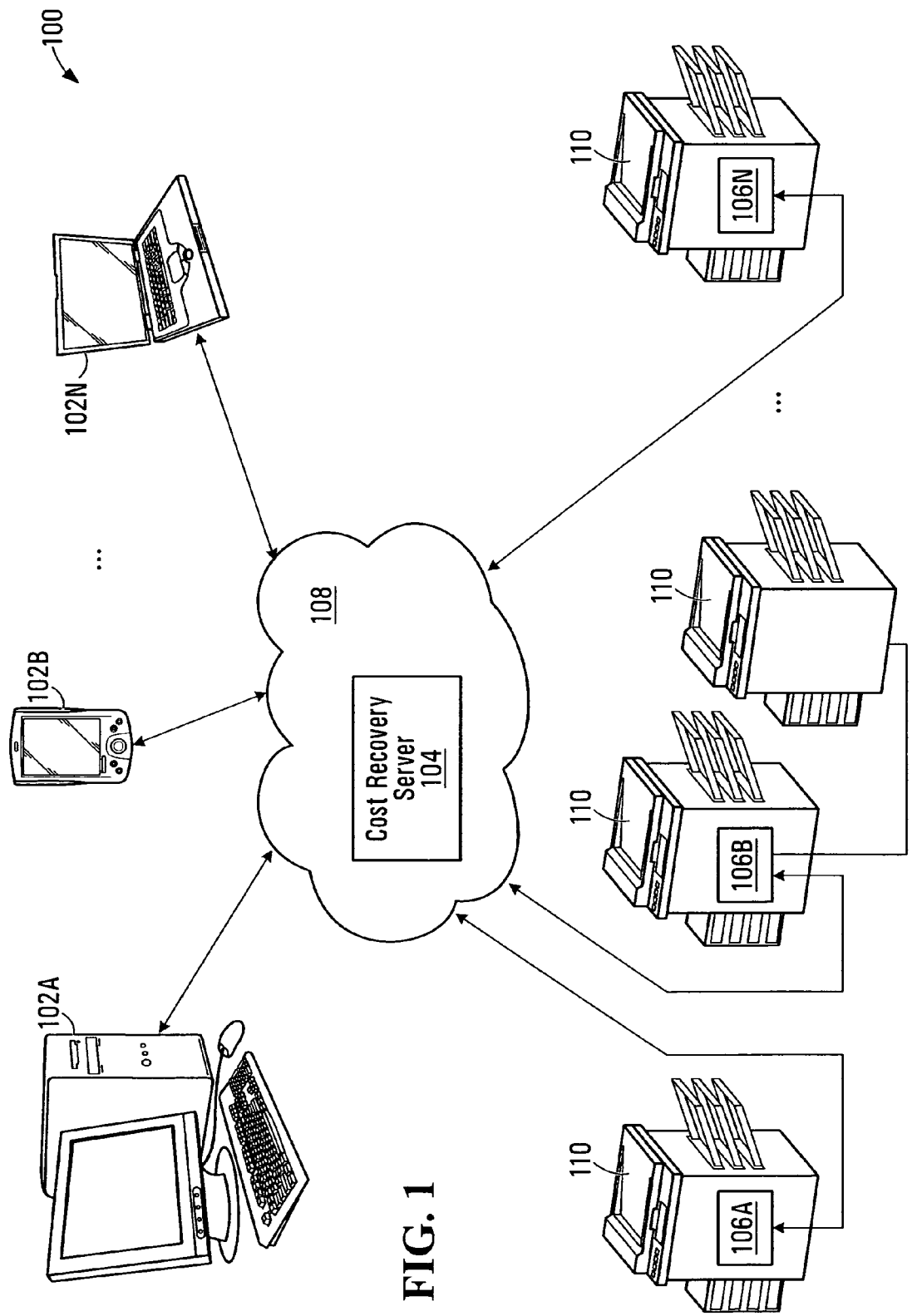
FIG. 1 is a block diagram illustrating a cost recovery system for multi-functional photocopier devices, according to an embodiment of the present invention.

FIG. 1 is a block diagram illustrating a cost recovery system for photocopier devices, according to an embodiment of the present invention. The system 100 includes a plurality of workstations 102A . . . 102N (also referred to as workstation(s) 102), interconnected via a communications network 108. The system 100 also includes a cost recovery server (CRS) 104, which is a component of the communications network 108, as well as a plurality of controllers 106A . . . 106N (also referred to as controller(s) 106), each of which is connected to the communications network 108.

The communications network 108 may be a private network, such as an Intranet, LAN, WAN or VPN. Alternatively, the communications network 108 may be a public network, such as the Internet, or any other suitable type of network.

Examples of a workstation 102 include a personal computer (PC), a laptop, a Blackberry™, a notebook and a Personal Digital Assistant (PDA), among many other possibilities. Although the system 100 shown in FIG. 1 includes three workstations 102, it should be appreciated that more or less workstations 102 may be provided without departing from the scope of the present invention. Each workstation 102 is connected to the network 108 via a line connection or a wireless connection, either permanent or dial-up.

Each controller 106 is associated with at least one photocopier device 110, which may be a traditional photocopier device or a multi-functional photocopier device. More specifically, each controller 106 is adapted to control the operation of one or more photocopier devices 110, for example enabling a photocopier device 110 to perform a job or preventing a photocopier device 110 from performing a job. Although the system 100 shown in FIG. 1 includes three controllers 106 and four photocopier devices 110, it should be appreciated that more or less controllers 106 and more or less photocopier devices 110 may be provided without departing from the scope of the present invention.

Each one of the workstations 102 and each one of the controllers 106 is capable to connect to (or to be connected with) the CRS 104 via the network 108. More specifically, a respective communication channel may be established over the network 108 between the CRS 104 and any one of the workstations 102 or any one of the controllers 106.

Specific to the present invention, the CRS 104 acts as an intelligent interface between the workstations 102 and the controllers 106 of the photocopier devices 110, in order to isolate the above-discussed authentication and usage monitoring functions of cost recovery from the device control function of cost recovery. More specifically, in order to enable and use a particular photocopier device 110 requiring cost recovery control, a user may, from any workstation 102, reserve the particular photocopier device 110 via the CRS 104. It is the CRS 104 that then takes care of attempting to authenticate the user and, if authentication is successful, ensuring that the controller 106 associated with the particular photocopier device 110 enables the particular photocopier device 110 for use by the user. Furthermore, the CRS 104 is capable to analyze usage of the particular photocopier device 110 by the user and to generate cost recovery data for the photocopy, fax or scan job performed by the user on the particular photocopier device 110. The CRS 104 performs this analysis and generation of cost recovery data on the basis of captured photocopy/fax/scan job data received from the controller 106 associated with the particular photocopier device 110, as will be discussed in further detail below.

Advantageously, by providing an intelligent interface such as the CRS 104 to connect the workstations 102 and the controllers 106 of the photocopier devices 110, access control and usage monitoring for each photocopier device 110 is not limited to a particular master apparatus, as in prior art cost recovery systems. Rather, any workstation 102 connected to the network 108 may enter into a cost recovery relationship with the controller 106 of any available photocopier device 110, including implementation of the above-described master functions of cost recovery.

Figure 2:
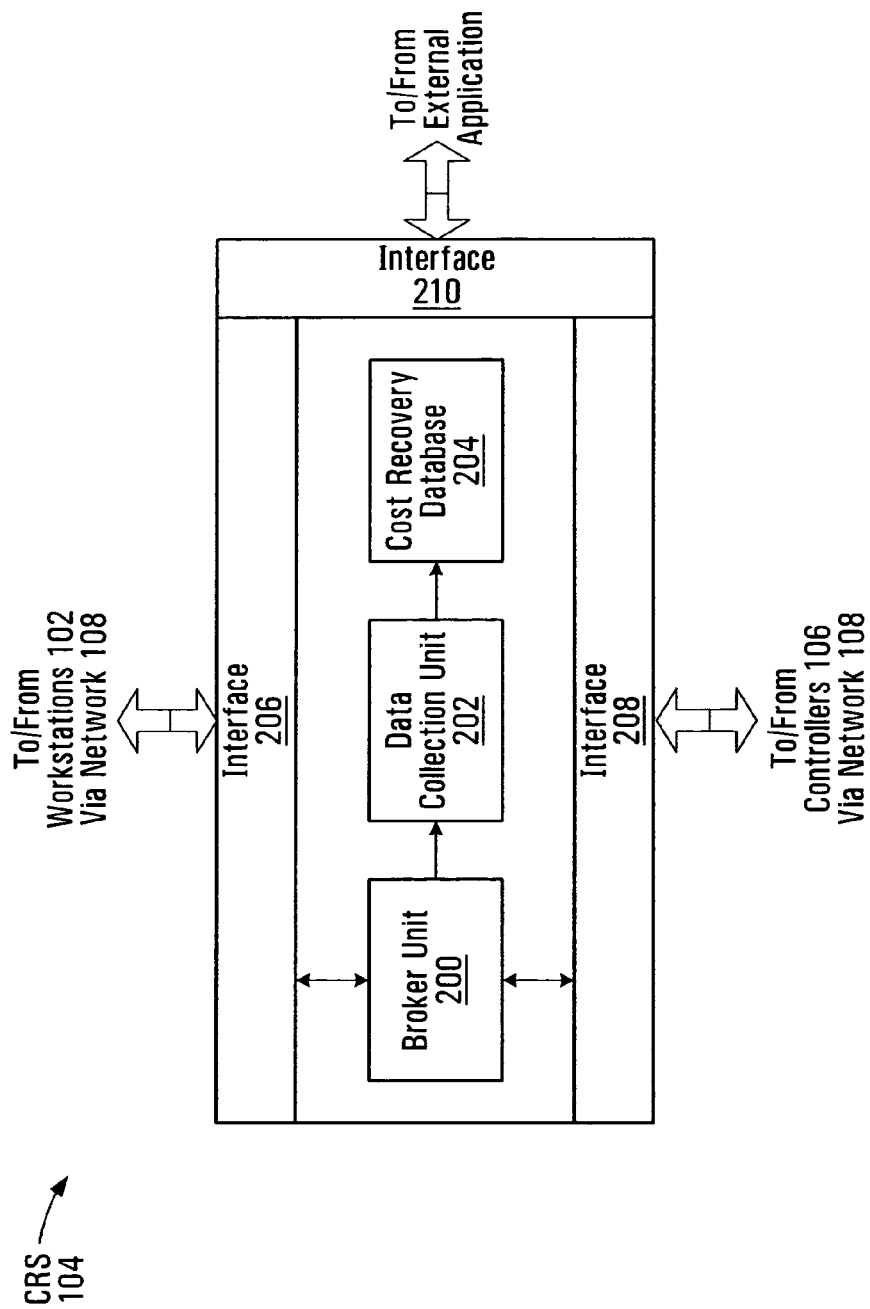
FIG. 2 is a functional block diagram of the cost recovery server shown in FIG. 1, according to a non-limiting example of implementation of the present invention.

FIG. 2 is a functional block diagram of the CRS 104, which includes a broker unit 200, a data collection unit 202 and a cost recovery database 204. In addition, the CRS 104 includes several interfaces 206, 208 and 210.

Each interface of the CRS 104 is operative to provide a portal for communications to and from the CRS 104. More specifically, each interface is adapted to communicate and coordinate with one or more external sources with which the CRS 104 exchanges data signals. In the example of FIG. 2:

interface 206 enables communication exchanges between the CRS 104 and the workstations 102;

interface 208 enables communication exchanges between the CRS 104 and the controllers 106; and optional interface 210 enables communication exchanges between the CRS 104 and an external application, such as a remote billing or accounting application.

These interfaces of the CRS 104 all perform standard, well-known functionality relating to the exchange of data communications, such as data streaming, push/pull commands, translation functions for data and command interpretation, event configuration, notifications, and provisioning, among other possibilities. Each interface also implements a registration process with its respective external source(s), in order to negotiate and establish parameters defining the communications between the external source and the interface, such as the format, nature and timing of exchanged information elements. Furthermore, each interface is capable to perform source-specific operations and/or applications dependent on the particular requirements of the external source in communication with the respective interface.

Note that various different implementations of the interfaces 206, 208, 210 of the CRS 104 are possible without departing from the scope of the present invention. These interfaces may adopt text-based, XML or SIP formats for communications exchanges with their respective external sources, among other possibilities. Each of these interfaces will also typically contain middleware implementing specific applications.

The broker unit 200 is operative to broker a cost recovery relationship between a particular workstation 102 and the controller 106 of a particular photocopier device 110. Upon receiving a request from a user on any one of the workstations 102 to reserve a photocopier device 110, the broker unit 200 verifies the availability of the various photocopier devices 110 and/or their associated controllers 106 and enables the user to make a selection of one or more photocopier devices 110 that could be used by the user to perform the respective photocopy/fax/scan job. The broker unit 200 also submits the user to an authentication process at the respective workstation 102, in order to ensure that the user is authorized to use the selected photocopier device(s) 110. In addition to prompting the user for identification information, which may include for example a user name, a password and an account number, the authentication process may also include prompting the user to provide job description information relative to the photocopying job to be performed. This requested job description information, which is needed for cost recovery purposes, may include for example a client name and a file number, among many other possibilities.

In a specific, non-limiting example of implementation, the broker unit 200 of the cost recovery server 104 directs the respective workstation 102 to launch a user interface on its display, in order to exchange communications with the user. In a specific example, this user interface prompts the user via one or more data capture dialog boxes or screens to input user identification and job description information, for authentication and cost recovery purposes. The data input by the user via the user interface is transmitted from the respective workstation 102 back to the broker unit 200, over the network 108. Alternatively, rather than prompting the user for authentication information via the user interface, the workstation 102 may be operative to retrieve the authentication information requested by the broker unit 200 from an existing network login account associated with the user, from a configuration or initialization file associated with the user or from an external data source, among many other possibilities.

The broker unit 200 may use various different techniques in order to verify the availability of the photocopier devices 110 and/or their associated controllers 106. In a specific, non-limiting example, the broker unit 200 maintains and regularly updates a list of all of the photocopier devices 110 that are active within the cost recovery system 100, where this list includes for each photocopier device 110 an indication of the current state of availability of the respective photocopier device 110 (for example "reserved for a user" or "in use" or "available"). In an alternative example, the broker unit 200 polls each of the various controllers 106 in order to obtain a status check for the associated photocopier devices 110.

The particulars of the authentication process implemented by the broker unit 200 may vary depending on the specific requirements of the particular work environment in which the cost recovery system 100 is being used. Furthermore, the authentication process may be customized to suit the needs of the particular work environment. In a specific, non-limiting example of implementation, the authentication process is based on a set of predefined rules and a user profile database, which are defined, maintained and updated by a system administrator. The user profile database includes a plurality of entries, each entry being associated with a particular user registered to use the cost recovery system 100. Each entry in the user profile database maps a user profile to the respective user, where this user profile is consulted by the broker unit 200 on a basis of the set of predefined rules when attempting to authenticate the identification information and/or the job description information that the respective user submits when requesting to reserve a photocopier device 110. In one example, a user profile includes a unique identifier and password combination for the respective user, as well as a set of one or more accounts that the user is authorized to use. The user profile database may be stored within the CRS 104 or may be stored remotely from the CRS 104, accessible via the network 108 or a dedicated connection. In alternative examples of implementation, the broker unit 200 of the CRS 104 may access some other external database or may use a check-digit algorithm to perform the authentication process, among many other well-known possibilities. Since details of the implementation of the authentication process required by a cost recovery system have been well documented and are well known to those skilled in the art, they will not be described in further detail herein.

The broker unit 200 is also operative to exchange communications with the controllers 106 of the photocopying devices 110, via the interface 208. In particular, the broker unit 200 is operative to direct a controller 106 to enable a particular photocopying device 110 for use by an authenticated user. The broker unit 200 may either direct the enabling of the particular photocopying device 110 immediately in response to authentication of the user by the broker unit 200 or, alternatively, may await identification of the user at the controller 106 before directing the enabling of the particular photocopying device 110. These different options for enabling the photocopying devices 110 for use by the authenticated users will be discussed in further detail below.

Upon completion of a photocopying job by an authenticated user on a particular photocopying device 110, the associated controller 106 will transmit back to the broker unit 200 of the cost recovery server 104 the captured photocopy/fax/scan job data. The broker unit 200 passes this photocopy/fax/scan job data onto the data collection unit 202, along with the associated user identification and job description information originally input by the user at the respective workstation 102 during the authentication process.

The data collection unit 202 receives from the broker unit 200 user identification and job description information associated with a particular photocopying/faxing/scanning job, as well as photocopy/fax/scan job data for the particular photocopying/faxing/scanning job. The data collection unit 202 is operative to process all of this data in order to generate therefrom cost recovery data (also referred to as transaction expense data) associated with the particular photocopying/faxing/scanning job, where this cost recovery data reflects a service charge for the particular photocopying/faxing/scanning job. In the example shown in FIG. 2, this cost recovery data is then stored by the data collection unit 202 in a cost recovery database 204, which is managed and updated by the data collection unit 202. Optionally, the transaction expense data generated by the data collection unit 202 may be transmitted by the data collection unit 202 to an external remote application, such as a remote billing or accounting application, via the interface 210. This transmission of the generated cost recovery data may be effected automatically by the data collection unit 202 or, alternatively, may be effected in response to a request for the cost recovery data from the remote billing or accounting application.

Note that, alternatively, the cost recovery database 204 may be implemented separately from the CRS 104, either as a standalone database or as a component of a distinct system. In either case, the content of the cost recovery database 204 is managed and updated either by the data collection unit 202 or by a distinct, dedicated data management unit in communication with the data collection unit 202. In yet another alternative, there is no cost recovery database 204, the cost recovery data generated by the data collection unit 202 instead being transmitted directly to an external remote application or system for storage and/or use in financial operations (i.e. billing or accounting).

It is important to note that the cost recovery data generated by the data collection unit 202 is not limited to any particular type or format. Furthermore, the processing effected by the data collection unit 202 to generate cost recovery data may be defined by different steps, rules, formulae or equations, among other possibilities, without departing is from the scope of the present invention. Details of this processing, as well as of the type/format of the generated cost recovery data, are not critical to the present invention, such that they will not be discussed further herein.

Figures 9, 10:
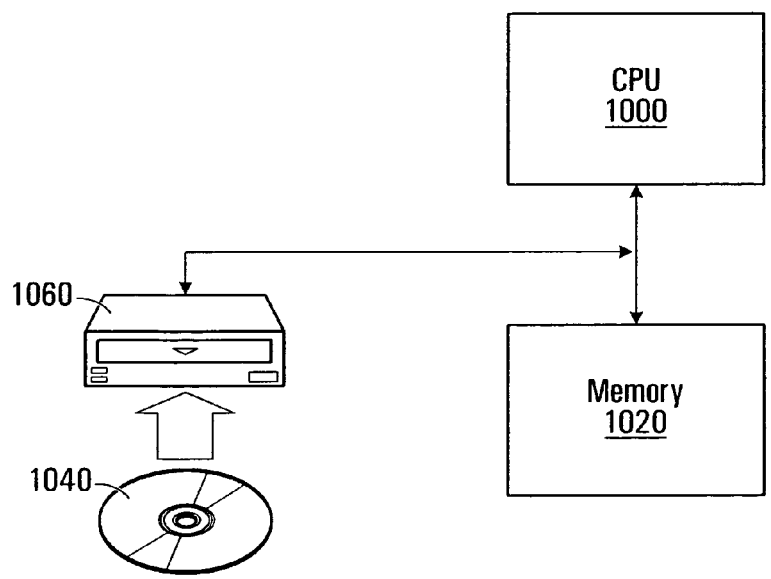
FIG. 9 illustrates a possible configuration for the content of the cost recovery database shown in FIG. 2, according to a non-limiting example of implementation of the present invention.
FIG. 10 is a block diagram of a computing device forming a suitable platform for the implementation of the one or more components of the cost recovery system seem in FIG. 1, in accordance with a non-limiting example of implementation of the present invention.

The cost recovery database 204 stores the cost recovery data generated by the data collection unit 202. FIG. 9 illustrates a non-limiting example of a possible configuration for the content of the cost recovery database 204. As shown, each row of the database corresponds to a separate entry of cost recovery data generated by the data collection unit 202. In the particular example shown in FIG. 9, each entry includes a user identifier, a date and time at which the job occurred, an account to which the service charge is to be billed, a type of service performed by the photocopier device (where "PH" represents a photocopying job, "S" represents a scanning job and "F" represents a faxing job) and a service charge to be billed. Obviously, many different configurations for the content of the cost recovery database 204 are possible, with the database entries including more or less information than that shown in FIG. 9, without departing from the scope of the present invention.

Figure 3:
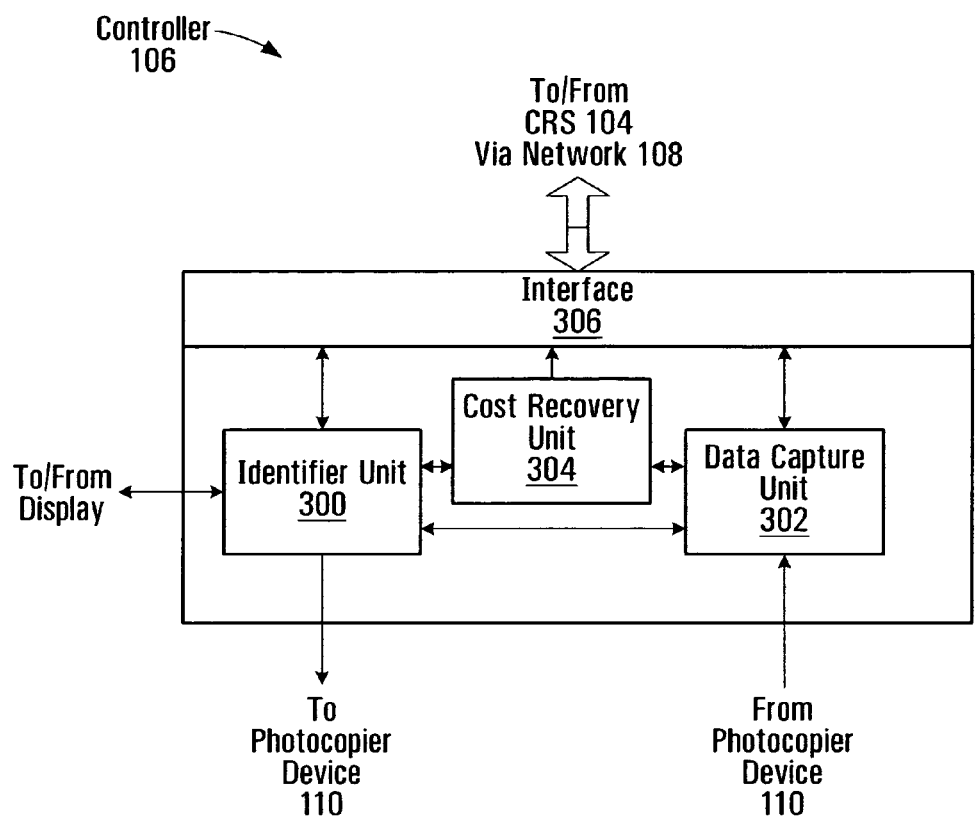
FIG. 3 is a functional block diagram of a controller of a multi-functional photocopier device, according to a non-limiting example of implementation of the present invention.

FIG. 3 is a functional block diagram of a controller 106, which includes an identifier unit 300, a data capture unit 302 and a cost recovery unit 304, as well as interface 306.

It should be noted that each controller 106 may be operative to control the operation of a single photocopier device 110 or, alternatively, of two or more photocopier devices 110. In the case where the controller 106 is associated with a single photocopier device 110, the controller 106 may be implemented by software embedded within the respective photocopier device 110 or, alternatively, may be implemented in hardware as a physical box mounted to the respective photocopier device 110. In the case where the controller 106 is associated with two or more photocopier devices 110, the controller 106 may be implemented by software embedded within one or more of its associated photocopier devices 110 or, alternatively, may be implemented in hardware as a physical box mounted to one of its associated photocopier devices 110 or as a standalone unit.

The interface 306 of the controller 106 is operative to provide a portal for communications to and from the CRS 104. More specifically, the interface 306 enables communication exchanges between the controller 106 and the CRS 104. The interface 306 of the controller 106 performs standard, well-known functionality relating to the exchange of data communications, such as data streaming, push/pull commands, translation functions for data and command interpretation, event configuration, notifications, and provisioning, among other possibilities. The interface 306 also implements a registration process with the CRS 104, in order to negotiate and establish parameters defining the communications between the CRS 104 and the interface, such as the format, nature and timing of exchanged information elements. Furthermore, the interface 306 is capable to perform source-specific operations and/or applications dependent on the particular requirements of the CRS 104.

Note that various different implementations of the interface 306 of the controller 106 are possible without departing from the scope of the present invention. This interface 306 may adopt text-based, XML or SIP formats for communications exchanges with the CRS 104, among other possibilities. The interface 306 may also contain middleware implementing specific applications.

The identifier unit 300 of the controller 106 is responsible for controlling the operation of the associated photocopier device(s) 110. By default, the identifier unit 300 maintains the associated photocopier device(s) 110 in a disabled state, such that the associated photocopier device(s) 110 can not be used freely by any user at any time. The identifier unit 300 is responsive to instructions received from the CRS 104 via the interface 304 to enable one or more of its associated photocopier devices 110 for use by a user that has previously been authenticated by the CRS 104.

It should be noted that when the identifier unit 300 of the controller 106 enables an associated photocopier device 110, this may be done for a predetermined period of time only. The identifier unit 300 is responsive to various different termination events to return the respective photocopier device 110 to the disabled state, including for example completion of a photocopying job performed by a user on the respective photocopier device 110, an inactivity timeout or a lapse of the predetermined period of time, among other possibilities.

The identifier unit 300 also implements at least in part a user interface that includes data capture dialog box(es) or screen(s) presented to a user via a display. This user interface may also include any one or a combination of a keyboard, a pointing device, a touch sensitive surface, a fingerprint scanner, a speech recognition unit and a card reader, among other possibilities, via which a user may input information to the controller 106. The display and its accessories are mounted either on one of the photocopier devices 110 associated with the controller 106 or on the controller 106 itself. The identifier unit 300 is responsive to a user entering identification information via the user interface to transmit a validation message to the CRS 104. This validation message includes identification of the particular photocopier device 110 that the user wishes to use, as well as the identification information input by the user. The broker unit 200 of the CRS 104 is operative to verify that the user's credentials match those of a user previously authenticated by the CRS 104. If verification is successful, the broker unit 200 sends back to the identifier unit 300 instructions to enable the particular photocopier device 110. If verification fails, the broker unit 200 sends back to the identifier unit 300 a message indicating that verification failed.

In the case of receiving a "verification failed" message from the broker unit 200, the identifier unit 300 is operative to pass control onto the cost recovery unit 304, which implements locally a traditional cost recovery function. Thus, the cost recovery unit 304 directs the identifier unit 300 to prompt the user via the display of the controller 106 for user identification information and job description information, which the user inputs via the user interface. The cost recovery unit 304 next attempts to authenticate the user and, if this authentication is successful, directs the identifier unit 300 to enable the associated photocopier device 110 for use by the user, independently of the CRS 104. If this authentication fails, the cost recovery unit 304 directs the identifier unit 300 to display an "authentication failed" message to the user via the display of the controller 106 and to maintain the requested photocopier device 110 in the disabled state. Optionally, the cost recovery unit 304 may advise the CRS 104 of the enabling of the associated photocopier device 110 for use by the user.

Note that, as in the case of the broker unit 200 discussed above, the particulars of the authentication process implemented by the cost recovery unit 304 may vary depending on the specific requirements of the particular working environment in which the cost recovery system 100 is being used. In a specific, non-limiting example of implementation, the cost recovery unit 304 has access to the same user profile database as accessed by the broker unit 200, for use in authenticating a user. Alternatively, the cost recovery unit 304 may contact the CRS 104 and request that the CRS 104 authenticate the user. In yet another alternative, a local user profile database is stored within the controller 106 itself, for use by the cost recovery unit 304 when attempting to authenticate a user. The cost recovery unit 304 may also access some other external database or may use a check-digit algorithm to perform the user authentication, among many other possibilities. Since details of the implementation of the authentication process required by a cost recovery system have been well documented and are well known to those skilled in the art, they will not be described in further detail herein.

The data capture unit 302 is operative to monitor usage of an associated photocopier device 110 while it is performing a job for a user and to capture photocopy/fax/scan job data. In a specific, non-limiting example, photocopy job data may include a number of pages photocopied by the photocopier device 110, a page size of the paper used by the photocopier device 110 and a number of copies generated by the photocopier device 110, while scan job data may include an image size and image attributes. It should be noted that the photocopy/fax/scan job data captured by the data capture unit 302 may vary in type or nature, without departing from the scope of the present invention. Furthermore, the functionality of such a data capture unit 302 is well known to those skilled in the art and will not be described in further detail herein.

Upon completion of a photocopying/faxing/scanning job by an associated photocopier device 110, the data capture unit 302 transmits the captured photocopy/fax/scan job data, along with identification of the particular photocopier device 110 used to perform the job, back to the CRS 104 for processing and storage. However, when control is passed from the identifier unit 300 to the cost recovery unit 304 and it is the latter that authenticated the user and directed enabling of the photocopier device 110, the data capture unit 302 transmits the captured photocopy/fax/scan job data back to the cost recovery unit 304, rather than to the CRS 104. The cost recovery unit 304 is operative to process the user identification and job description information associated with a particular photocopying/faxing/scanning job, as well as the photocopy/fax/scan job data, in order to generate therefrom cost recovery data associated with the particular photocopying/ faxing/scanning job. The cost recovery unit 304 then transmits this cost recovery data back to the CRS 104 for storage in the cost recovery database 204. Alternatively, the cost recovery data generated by the cost recovery unit 304 is transmitted by the cost recovery unit 304 directly to an external remote application or system for storage and/or use in financial operations (i.e. billing or accounting).

It is important to note that, as in the case of the data collection unit 202, the cost recovery data generated by the cost recovery unit 304 is not limited to any particular type or format. Furthermore, the processing effected by the cost recovery unit 304 to generate cost recovery data may be defined by different steps, rules, formulae or equations, among other possibilities, without departing from the scope of the present invention. Details of this processing, as well as of the type/format of the generated cost recovery data, are not critical to the present invention, such that they will not be discussed further herein.

The basic structure of a workstation 102 and of the CRS 104 is shown in FIG. 10. The computing device has a Central Processing Unit (CPU) 1000, a memory 1020 and a bus connecting the CPU 1000 to the memory 1020. The memory 1020 holds program instructions for execution by the CPU 1000. These program instructions may be stored on a computer readable medium 1040, such as a CD-ROM, that is external to the computing device. The CD-ROM 1040 can be read by an optical disk drive 1060 to load the program instructions in the memory 1020. The computer readable medium 1040 may be part of a remote computing platform that is in some way connected to the computing platform that executes the program element for allowing the data transfer necessary to pass the program element to the computing platform on which the execution will take place. For example, a file server containing the program element that can be accessed over any suitable connection by another computing platform to obtain the program element is considered a computer readable medium storing the program element.

In the case of the CRS 104, the memory 1020 holds program instructions for execution by the CPU 1000 to implement the functionality of the broker unit 200 and the data collection unit 202. Furthermore, the memory 1020 may store the cost recovery database 204.

In an alternative example of implementation, part of the functionality of the broker unit 200 of the CRS 104 is implemented by each workstation 102. More specifically, software implementing sub-functionality of the broker unit 200 may reside on each workstation 102. In a specific non-limiting example, the software that resides on each workstation 102 implements, in cooperation with the broker unit 200, the above-described photocopier device selection function and the user authentication function. The software residing on each workstation 102 may also implement at least in part the above-described user interface for exchanging communications with the user.

It should be noted that the present invention is not limited to any specific division of cost recovery functions/tasks/capability between the workstations 102, the CRS 104 and the controllers 106. Although a typical and general division of cost recovery functionality has been described above, different functionality breakdowns may be provided and implemented without departing from the scope of the present invention. Furthermore, various different implementations of the cost recovery system 100 in software, hardware or both are possible without departing from the scope of the present invention.

Figure 4:
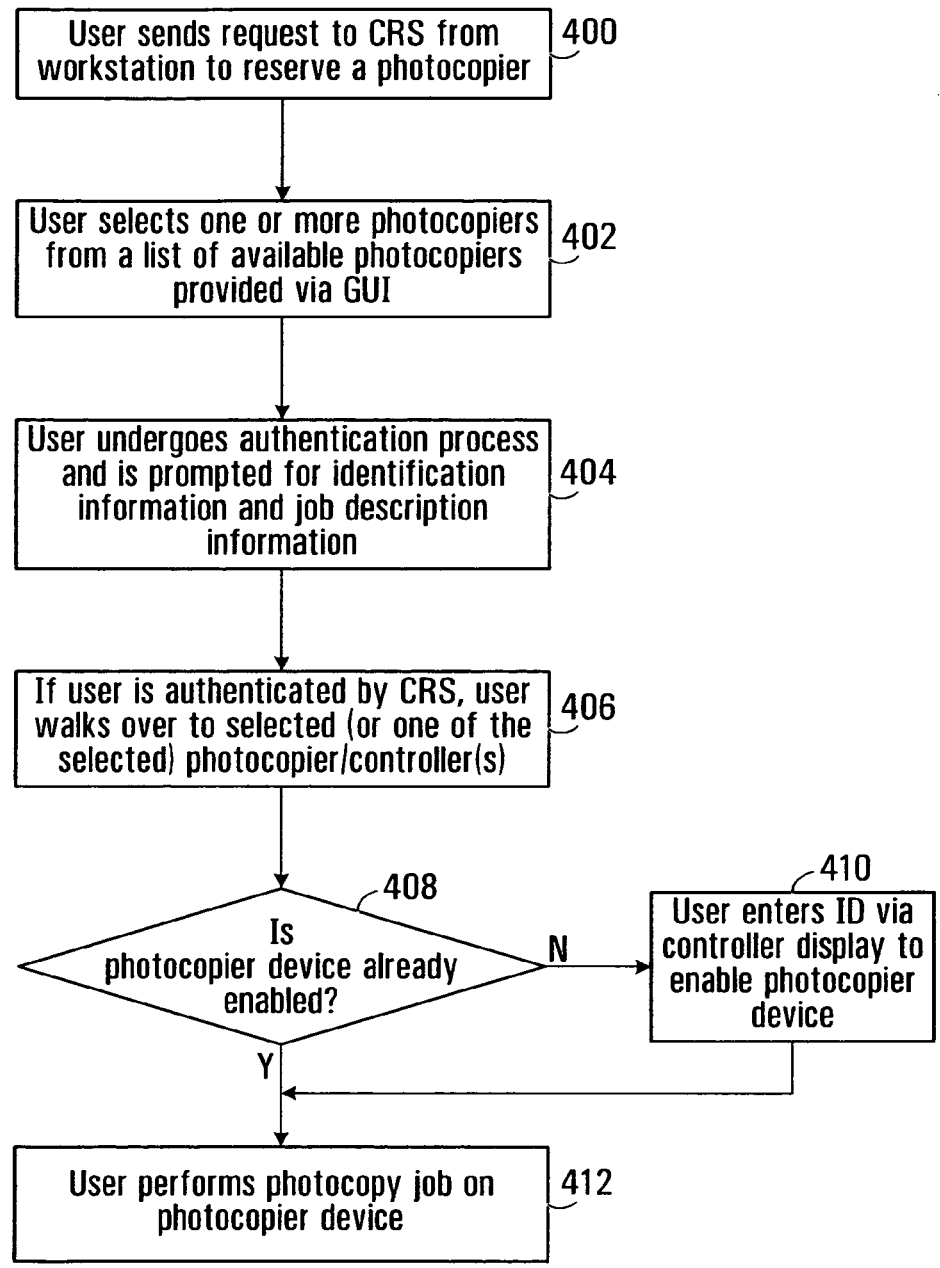
FIG. 4 is a flowchart showing steps in the operation of the cost recovery system from the user's perspective when the user wants to perform a photocopying job, according to a non-limiting example of implementation of the present invention.

FIG. 4 is a flow chart showing steps in the operation of the cost recovery system 100 from the user's perspective when a user wants to perform a photocopying job, according to a non-limiting example of implementation of the present invention. At step 400, the user submits a request to the CRS 104 to reserve a photocopier device 110. In order to submit this request, the user launches a dedicated photocopier reservation application or program from his/her workstation 102, where this application/program may be run locally on the workstation 102, remotely from the CRS 104 or cooperatively by both the workstation 102 and the CRS 104. At step 402, the user is prompted via a graphical user interface (GUI) shown on the display of the workstation 102 to select one or more photocopier device(s) 110 from a group of available photocopier devices 110, for example via a drop-down list within a data capture screen. The available photocopier devices 110 may be listed by name, by location and/or by associated controller 110, among many other possibilities.

Once the user has selected one or more photocopier device(s) 110 from the group of available photocopier devices 110, the user is submitted to an authentication process at step 404 via the user interface shown on the display of the workstation 102, in order to ensure that the user is authorized to use the selected photocopier device(s) 110. In a specific example of this authentication process, the user is prompted via a data capture dialog box or screen to provide user identification information, which may include a user name, a password and an account number, among other possibilities. The user may also be prompted to provide job description information relative to the job to be performed by the selected photocopier device(s) 110 for cost recovery purposes, where this job description information may include a client name and a file number, among other possibilities. As a final step in the authentication process, the user will receive a message via the user interface indicating whether authentication has failed or succeeded. In the case of a successful authentication, the message may also include an indication of a predefined time delay within which the photocopying job must be performed on the (or one of the) selected photocopier device(s) 110. In a specific example, this predefined time delay may be 5 minutes, 10 minutes or 15 minutes, among many other possibilities.

If authentication is successful, the user then walks up to the (or one of the) selected photocopier device(s) 110 at step 406. At step 408, the user determines whether or not the particular photocopier device 110 has already been enabled for his/her use. If so, the user proceeds to perform the photocopying job on the particular photocopier device 110 at step 412. If not, the user must enter user identification information via a display of the controller 106 (which may be mounted to the particular photocopying device 110 itself or to the associated controller 106) at step 410. Assuming that this user identification information is correctly input by the user, the particular photocopying device 110 then acquires the enabled state and the user proceeds to perform the photocopying job on the particular photocopying device 110 at step 412.

Figure 11:
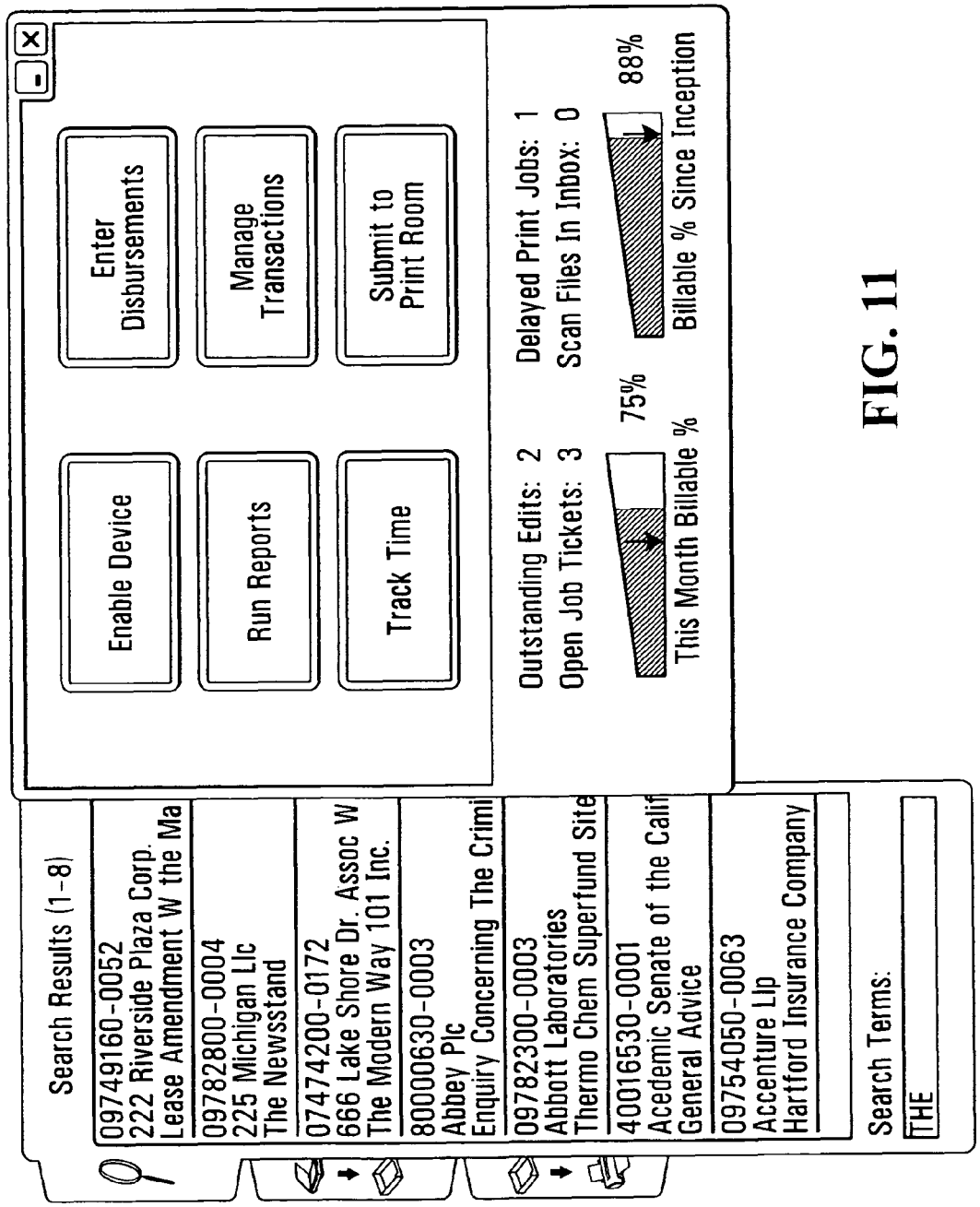
Figure 12:
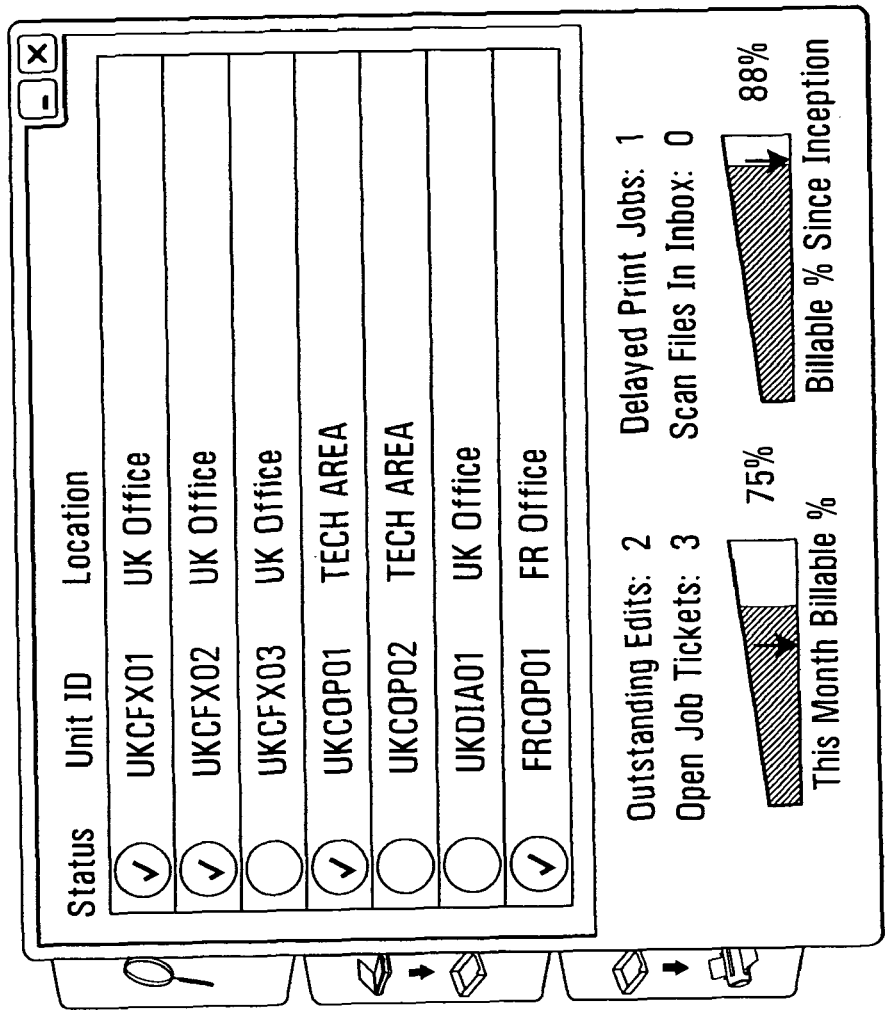

Examples of various screens and menus forming part of the graphical user interface seen by the user on the workstation 102 when reserving a photocopier device 110 and undergoing the authentication process can be seen in FIGS. 11 to 13. More specifically, FIG. 11 is an example of the main screen of the photocopier reservation application or program launched by the user on the workstation 102; FIG. 12 is an example of a data capture screen including a list of available photocopier devices 110 from which the user is to select one or more photocopier device(s) 110; and FIG. 13 is an example of a data capture screen prompting the user to submit authentication information, such as user identification information and job description information.

Figure 5:
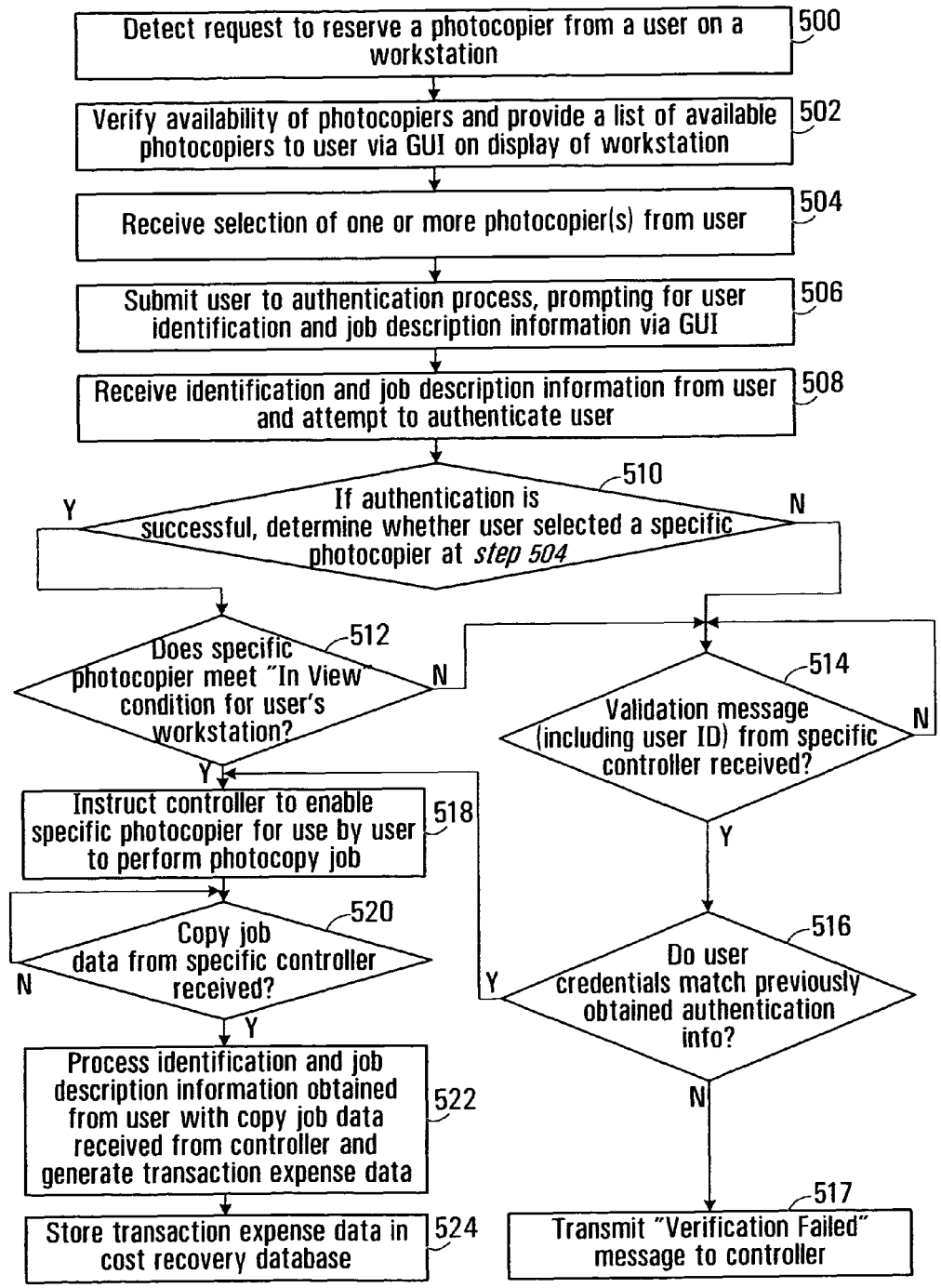
FIG. 5 is a flowchart showing steps in the operation of the cost recovery server when a user wants to perform a photocopying job on a walk-up photocopier device, according to a non-limiting example of implementation of the present invention.

FIG. 5 is a flow chart showing steps in the operation of the cost recovery system 100 from the perspective of the CRS 104 when a user wants to perform a photocopying job, according to a non-limiting example of implementation of the present invention. At step 500, the CRS 104 detects the launching of a dedicated photocopier reservation application or program on a particular workstation 102. In other words, the CRS 104 receives a request to reserve a photocopier device 110 from a user at the particular workstation 102. At step 502, the broker unit 200 of the CRS 104 verifies the availability of the photocopier devices 110 and transmits back to the workstation 102 a list of available photocopier devices 110. This list of available photocopier devices 110 is displayed to the user at the particular workstation 102 via a graphical user interface shown on the display of the workstation 102.

At step 504, the broker unit 200 receives from the user a selection of one or more of the available photocopier devices 110. The broker unit 200 then submits the user to an authentication process at the particular workstation 102 at step 506, where this authentication process may be run remotely by the broker unit 200, locally by the particular workstation 102 or cooperatively by both the broker unit 200 and the particular workstation 102. The user is therefore prompted to input user identification information via the user interface shown on the display of the workstation 102. The user may also be prompted to input job description information relative to the job to be performed by the selected photocopier device(s) 110 for cost recovery purposes. At step 508, the broker unit 200 of the CRS 104 receives the user identification information and the job description information input by the user and verifies this information in order to ensure that the user is authorized to use the selected photocopier device(s) 110. Assuming that authentication of the user is successful, the broker unit 200 forwards the user identification and job description information on to the data collection unit 202 for processing and storage. Alternatively, the broker unit 200 may await receipt of the photocopy job data from the respective controller 106 once the photocopy job has been completed, before passing the user identification and job description information along with the captured photocopy job data on to the data collection unit 202. The broker unit 200 also sends back to the user a message indicating whether authentication has succeeded or failed.

In the case where authentication of the user is successful, the broker unit 200 is operative to implement at least two different scenarios for enabling the selected photocopying device(s) 110 for use by the authenticated user. If the selection received from the user at step 504 is indicative of a single photocopier device 110, the broker unit 200 determines whether the particular photocopier device 110 selected by the user is located within a certain proximity of the user's workstation 102, such that the particular photocopier device 110 meets an "in view" condition. In other words, the broker unit 200 determines whether or not the user can see the particular photocopier device 110 from his/her workstation 102 and therefore could prevent another user from walking up to the particular photocopier device 110 and attempting to use it. If the particular photocopier device 110 selected by the user meets the "in view" condition at step 512, the broker unit 200 generates and transmits to the respective controller 106 associated with the particular photocopier device 110 instructions to enable the particular photocopier device 110 at step 518. Accordingly, the particular photocopier device 110 becomes enabled for use by the user to perform his/her photocopy job.

In a specific, non-limiting example, the broker unit 200 consults a photocopier database in order to determine whether or not a photocopier device 110 meets an "in view" condition for a particular user. This photocopier database is maintained and updated by a system administrator and includes a plurality of entries, each entry being associated with a respective photocopier device 110 within the cost recovery system 100. Each entry in the photocopier database maps the respective photocopier device 110 to an indication of whether any workstations 102 within the cost recovery system 100 are "in view" of the respective photocopier device 110. The photocopier database may be stored within the CRS 104 or may be remote from the CRS 104, connected via the network 108 or a dedicated connection.

If the particular photocopier device 110 selected by the user does not meet the "in view" condition at step 512 or if the selection received from the user at step 504 is indicative of two or more photocopier devices 110, the broker unit 200 waits for receipt of a validation message from a controller 106 associated with the (or one of the) selected photocopier device(s) 110, at step 514. As discussed above, this validation message includes user identification information input by the user via a display of the controller 106/photocopier device 110, as well as identification of the particular photocopier device 110 that the user wishes to use. At step 516, the broker unit 200 verifies that the user's credentials received from the particular controller 106 match those from the earlier authentication process undergone by the user. If this verification is successful, the broker unit 200 sends back to the particular controller 106 instructions to enable the particular photocopier device 110 for use by the user, at step 518. Note that, if verification of the user's credentials fails, the broker unit 200 sends back to the particular controller 106 a message indicating that verification failed, at step 517.

It should be noted that when the broker unit 200 sends instructions to the particular controller 106 to enable the particular photocopier device 110 at step 518, these instructions may include a predefined period of time during which the controller 106 is to maintain the particular photocopier device 110 in the enabled state. For example, the instructions may specify that the controller 106 is only to maintain the particular photocopier device 110 in the enabled state for 10 minutes. Thus, if the user does not perform his/her photocopy job on the particular photocopier device 110 within these 10 minutes, the particular photocopier device 110 will be disabled and the user will have to go back to his/her workstation 102 and request use of the photocopier device 110 from the CRS 104 all over again.

At step 520, the broker unit 200 waits to receive the photocopy job data from the particular controller 106, which is captured while the particular photocopier device 110 is being used by the user. Upon receipt of this photocopy job data, the broker unit 200 forwards it on to the data collection unit 202 at step 522, where it is processed along with the user identification and job description information provided previously by the user during the authentication process, in order to generate transaction expense data. At step 524, the data collection unit 200 stores the generated transaction expense data in the cost recovery database 204.

Figure 6:
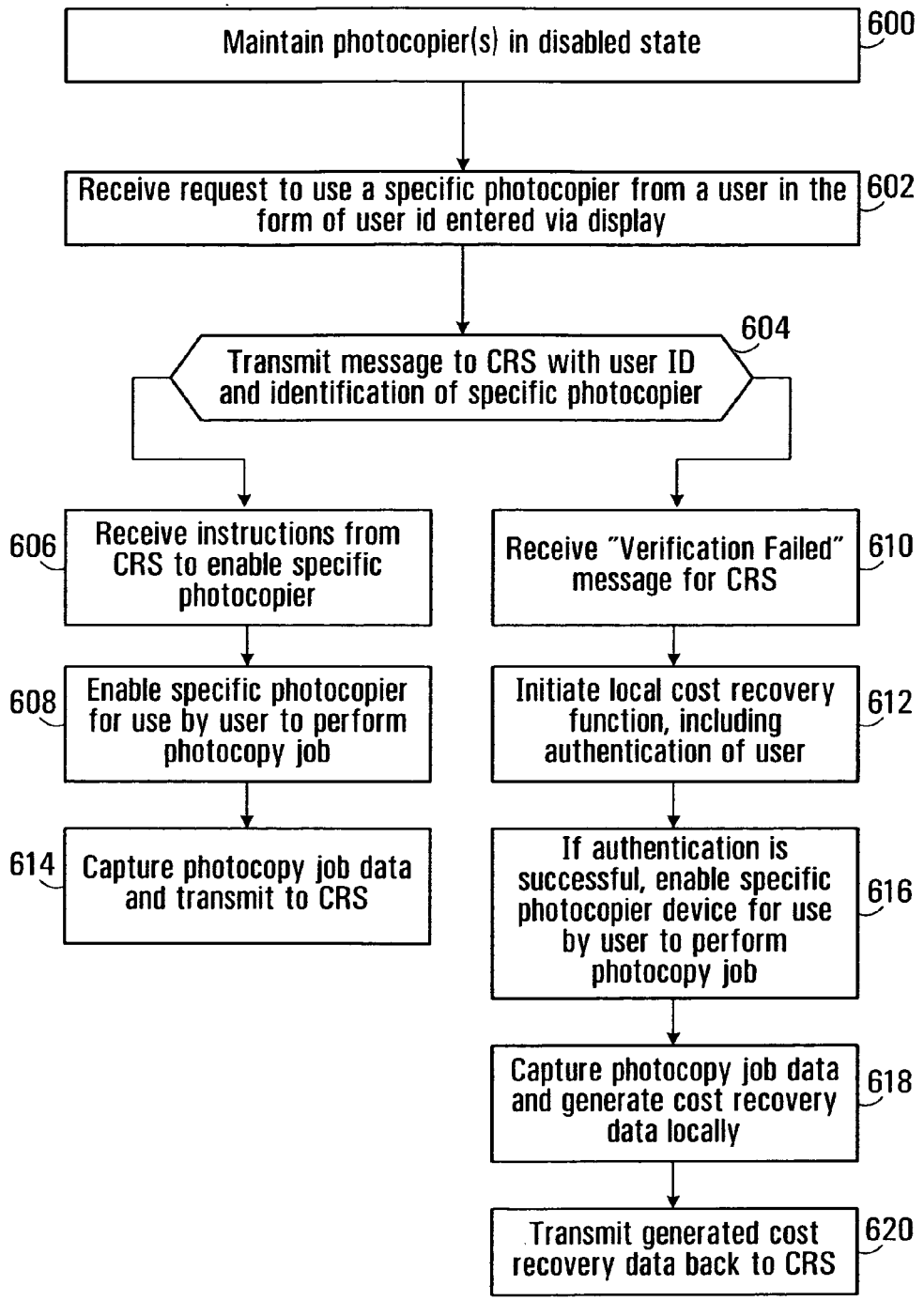
FIG. 6 is a flowchart showing steps in the operation of a controller of a multi-functional photocopier device, according to a non-limiting example of implementation of the present invention.

FIG. 6 is a flow chart showing steps in the operation of the cost recovery system 100 from the perspective of a controller 106 when a user wants to perform a photocopying job on a photocopier device 110 controlled by the controller 106, according to a non-limiting example of implementation of the present invention. Note that the example shown in FIG. 6 is based on the scenario in which a user must first identify themselves to the controller 106 before the photocopier device 110 can be enabled for use by the user.

At step 600, the controller 106 maintains its associated photocopier device(s) 110 in the disabled state. At step 602, the identifier unit 300 of the controller 106 receives a request to use a particular photocopier device 110 from the user, where this request takes the form of user identification information input by the user via a user interface provided on a display mounted to the controller 106 or the particular photocopier device 110. At step 604, the identifier unit 300 generates a validation message, including the user identification information input by the user and an identification of the particular photocopier device 110, and transmits this validation message to the CRS 104. At step 606, the identifier unit 300 receives instructions from the CRS 104 to enable the particular photocopier device 110 and, at step 608, the identifier unit 300 enables the particular photocopier device 110 for use by the user. Once the user has completed the photocopying job on the particular photocopier device 110, the data capture unit 302 transmits the captured photocopy job data back to the CRS 104 for processing and storage, at step 614.

At step 610, the controller 106 receives a message from the CRS 104 indicating that verification of the user's credentials failed. In this case, the cost recovery unit 304 of the controller 106 initiates a local cost recovery function, including directing the identifier unit 300 to prompt the user via the user interface of the display for authentication information, at step 612. If authentication of the user is successful, the cost recovery unit 304 directs the identifier unit 300 to enable the particular photocopier device 110 for use by the user at step 616 and, optionally, transmits a message back to the CRS 104 advising of the enabling of the particular photocopier device 110. Once the user has completed the photocopying job on the particular photocopier device 110, the data capture unit 302 transmits the captured photocopy job data back to the cost recovery unit 304 for processing and generation of cost recovery data, at step 618. The cost recovery unit 304 transmits the generated cost recovery data back to the CRS 104 at step 620, for storage in the cost recovery database 204.

Figure 7:
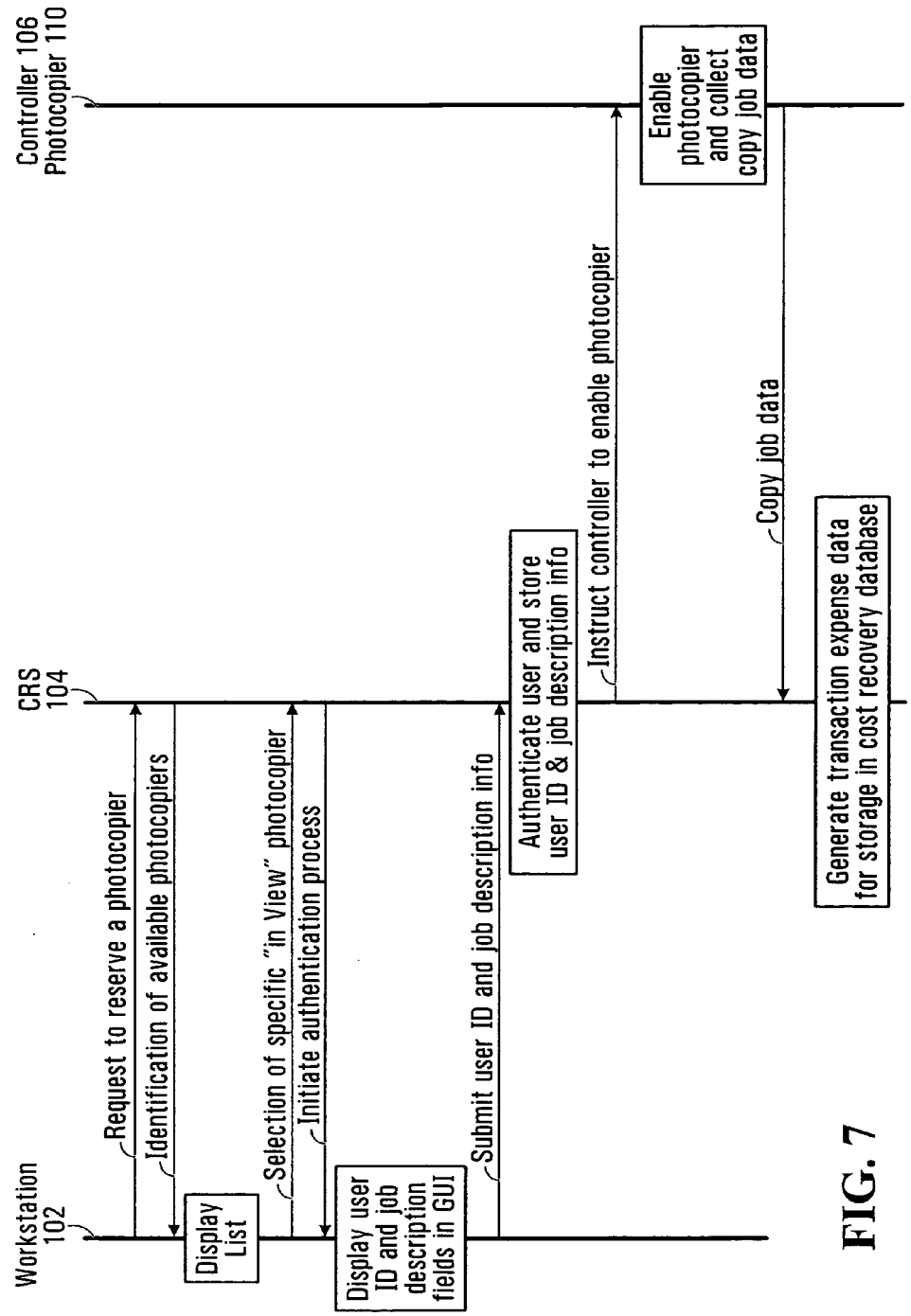
FIGS. 7 and 8 are signal flow diagrams showing steps in the operation of the cost recovery system when a user wants to perform a photocopying job on a photocopier device on the basis of the examples shown in FIGS. 4-6, in accordance with two different possible scenarios.
Figure 8:
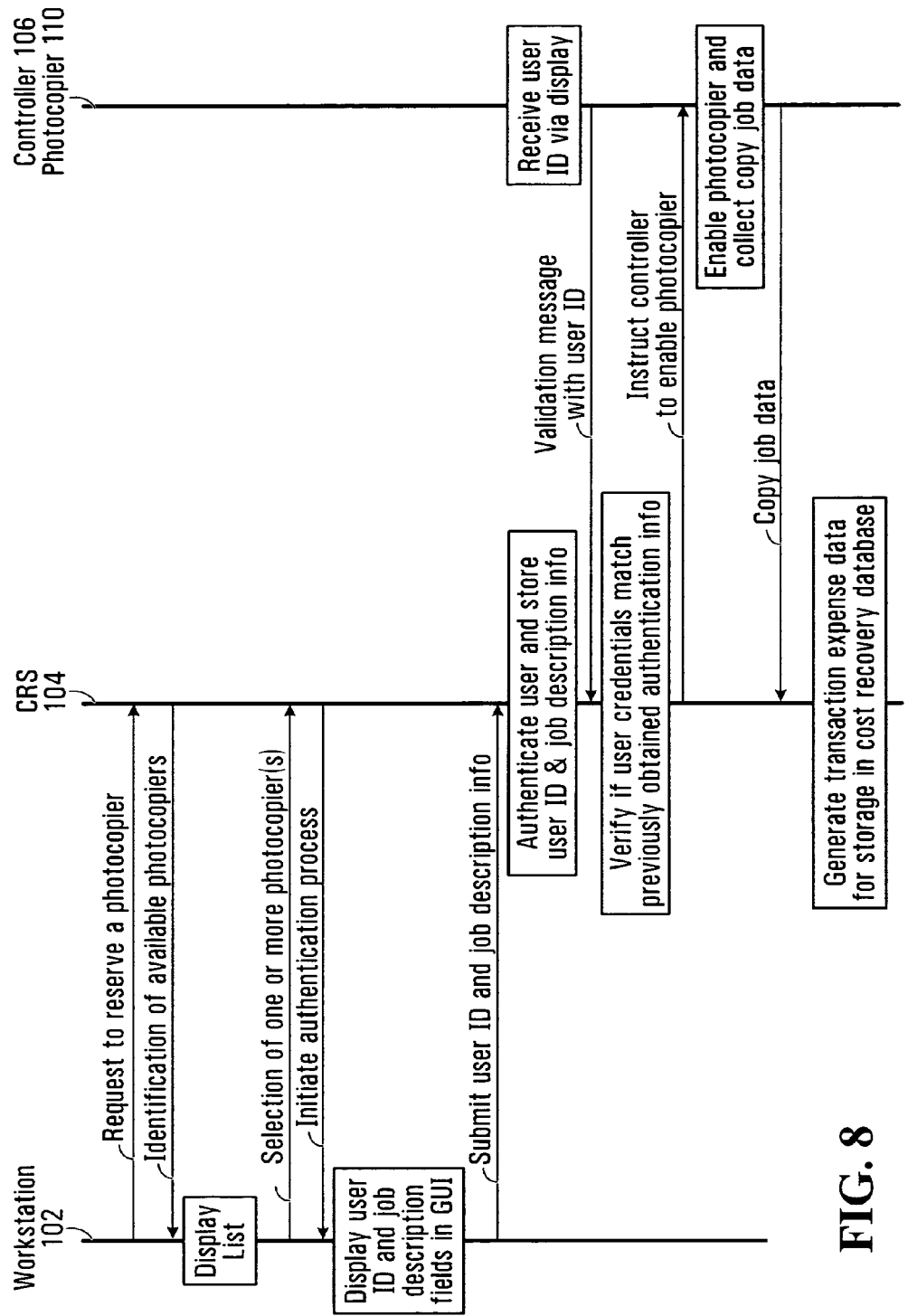

It should be noted that when the identifier unit 300 of the controller 106 enables the particular photocopier device 110 for use by the user at step 608, it may do so for a predefined period of time only. This predefined period of time may be set by either the CRS 104 or the identifier unit 300 itself. Upon expiry of this predefined period of time, the identifier unit 300 is operative to return the particular photocopier device 110 to the disabled state, even if the user has not yet used the particular photocopier device 110 to perform his/her photocopying job. As discussed above, when the particular photocopier device 110 has been enabled by the identifier unit 300, the latter is responsive to various different termination events to return the particular photocopier device 110 to the disabled state, including for example completion of the photocopying job performed by the user, an inactivity timeout or a lapse of the predetermined period of time, among other possibilities FIGS. 7 and 8 are signal flow diagrams summarizing the interaction between a workstation 102, the CRS 104 and a controller 106 when a user wants to perform a photocopying job, on the basis of the examples shown in FIGS. 4, 5 and 6. FIG. 7 illustrates the scenario in which the user selects a specific photocopier device 110 that meets the "in view" condition. FIG. 8 illustrates the scenario in which the user either selects a specific photocopier device 110 that does not meet the "in view" condition or selects two or more photocopier devices 110. Note that, in the examples of both FIGS. 7 and 8, the user is successfully pre-authenticated by the CRS 104, such that the controller 106 does not need to perform any local cost recovery function.

In a variant embodiment of the cost recovery system 100, the data capture unit 302 of the controller 106 is operative to generate cost recovery data, in addition to the function of capturing photocopy/fax/scan job data for the associated photocopier device 110. Under this embodiment, the above-described data processing and cost recovery data generation functions of the data collection unit 202 are transferred to the data capture unit 302 of each controller 106. Thus, when the broker unit 200 of the CRS 104 directs a controller 106 to enable an associated photocopier device 110 for use by an authenticated user, the broker unit 200 is operative to transmit to the identifier unit 300 of the particular controller 106 the authentication information input by the user during the authentication process. The identifier unit 300 then passes this authentication information on to the data capture unit 302, for processing along with the captured photocopy/fax/scan job data in order to generate complete cost recovery data. Accordingly, in this embodiment, upon completion of a pre-authenticated photocopy/scan/fax job on an associated photocopier device 100, the controller 106 transmits generated cost recovery data back to the CRS 104, as opposed to captured photocopy/scan/fax job data. The data collection unit 202 of the CRS 104 is then responsible for storing the cost recovery data received from the controller 106 in the cost recovery database 204 and/or for transmitting the received cost recovery data to an external remote application, such as a remote billing or accounting application.

It is important to note that, as in the case of the data collection unit 202, the cost recovery data generated by the data capture unit 302 of the collector 106 is not limited to any particular type or format. Furthermore, the processing effected by the data capture unit 302 to generate cost recovery data may be defined by different steps, rules, formulae or equations, among other possibilities, without departing from the scope of the present invention. Details of this processing, as well as of the type/format of the generated cost recovery data, are not critical to the present invention, such that they will not be discussed further herein.

In another variant embodiment of the cost recovery system 100, the controllers 106 do not implement any local cost recovery function. Thus, in the case where a controller 106 generates and transmits a validation message to the CRS 104 including user identification information input by a user to the controller 106 via the user interface, and the controller 106 receives a message back from the CRS 104 indicating that verification of the user's credentials failed, the user is not permitted to use the requested photocopier device 100. Rather, the controller 106 will display the "verification failed" message received from the CRS 104 to the user via the display mounted to the controller 106 or the particular photocopier device 110, and will maintain the particular photocopier device 110 in the disabled state.

In yet another variant embodiment of the cost recovery system 100, all of the above-described functionality of the cost recovery server 104 is divided between the workstations 102 and the controllers 106, such that the cost recovery server 104 may be bypassed. In other words, any one of the workstations 102 is capable to communicate directly with any one of the controllers 106, via the network 108, in order to establish a temporary cost recovery relationship regarding a photocopier device 110. Obviously, in this variant embodiment, the workstations 102 and the controllers 106 are provided with suitable interfaces for enabling communications therebetween. These interfaces perform standard, well-known functionality relating to the exchange of data communications, such as data streaming, push/pull commands, translation functions for data and command interpretation, event configuration, notifications, and provisioning, among other possibilities. These interfaces also negotiate and establish parameters defining the communications between the workstations 102 and the controllers 106, such as the format, nature and timing of exchanged information elements.

Under this variant embodiment, the CRS 104 may or may not be present within the system 100. For the purposes of the following discussion, we will assume that the CRS 104 is still a component of the network 108.

Figure 14:
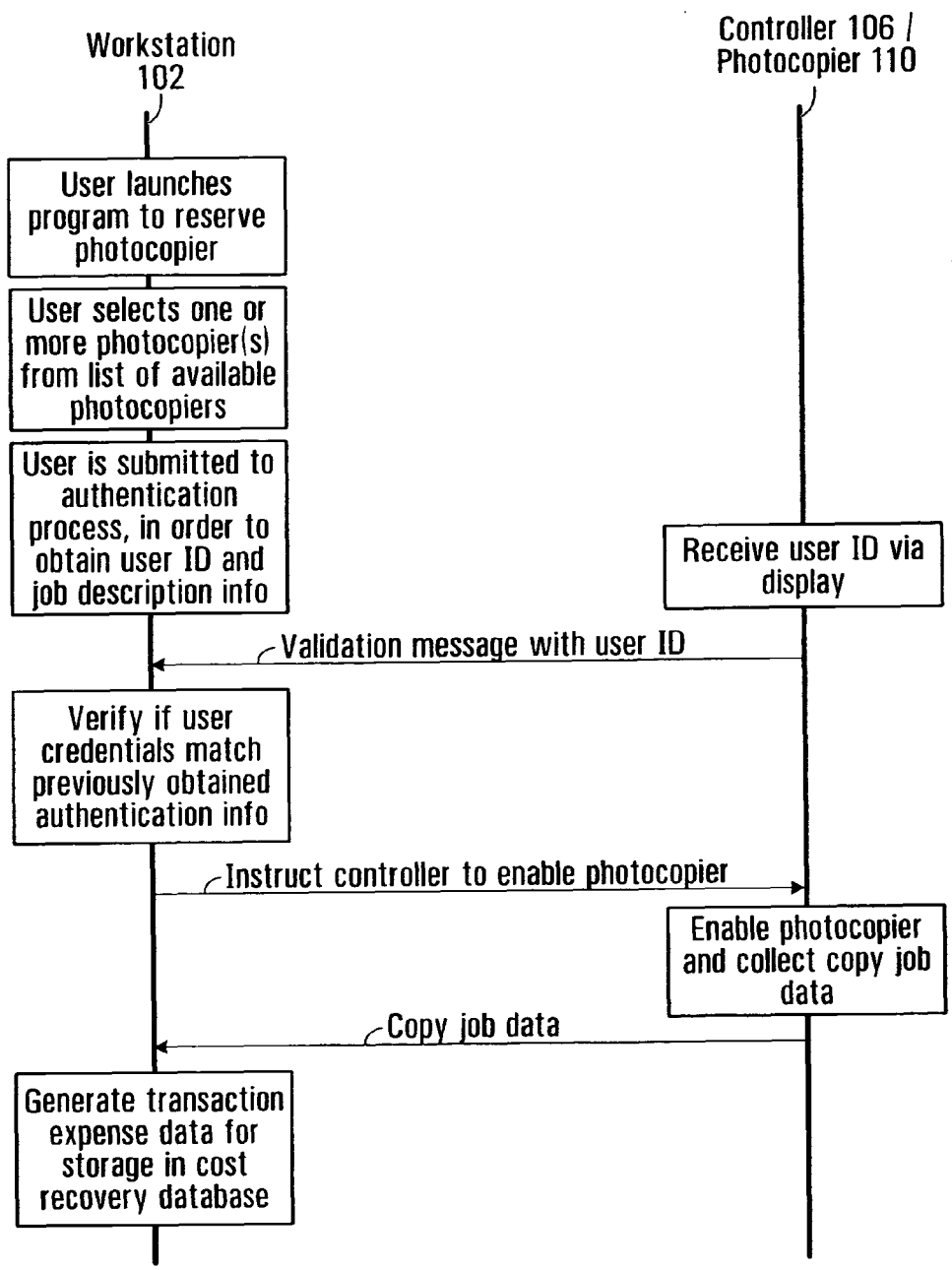
FIG. 14 is a signal flow diagram showing steps in the operation of the cost recovery system when a user wants to perform a photocopying job on a photocopier device, in accordance with a variant embodiment of the present invention.

In order to clarify the following description of this variant embodiment of the cost recovery system 100, FIG. 14 is a signal flow diagram summarizing an example of the direct interaction between a workstation 102 and a controller 106, when a user wants to perform a photocopying job, in accordance with this variant embodiment of the cost recovery system 100. FIG. 14 illustrates an example of the scenario in which the user either selects a specific photocopier device 110 that does not meet the "in view" condition or selects two or more photocopier devices 110.

In a specific example of implementation of this variant embodiment of the cost recovery system 100, each workstation 102 is operative to implement and/or initiate locally the above-described master functions of cost recovery. Thus, software implementing the above-discussed functionality of the broker unit 200 and the data collection unit 202 resides on each workstation 102, which may optionally also store a local cost recovery database. This functionality includes the photocopier device selection function, the user authentication function, implementing the user interface and, optionally, the maintaining/updating of the local cost recovery database.

Once a user has been authenticated at a particular workstation 102, the latter is operative to determine whether the user has selected a specific photocopier device 110 from the list of available photocopier devices 110 and, if so, whether the selected photocopier device 110 meets the "in view" condition for the particular workstation 102. If the "in view" condition is met, the particular workstation 102 communicates with the associated controller 106 via the network 108, in order to establish an exclusive communicative relationship therewith for a specific period of time. In a specific example, this communicative relationship is a fixed, peer-to-peer relationship, whereby the particular workstation 102 and the particular controller 106 temporarily work together in order to implement cost recovery for a photocopy/fax/scan job to be performed by the user. Thus, once this exclusive communicative relationship has been established, it is the particular workstation 102 that directs the particular controller 106 to enable the associated photocopier device 110 for use by the user to perform the photocopy/fax/scan job.

If the user has selected a specific photocopier device 110 that does not meet the "in view" condition, or has selected two or more different photocopier devices 110, the particular workstation 102 is operative to wait for receipt of a validation message including the user's identification information from the, or one of the, associated controller(s) 106. Upon receipt of this validation message from a particular controller 106, the particular workstation 102 proceeds to establish the exclusive communicative relationship with the particular controller 106 for a specific period of time and to direct the particular controller 106 to enable the associated photocopier device 110 for use by the user to perform the photocopy/fax/scan job.

The workstation 102 designates a particular controller 106 on a basis of a photocopier device 110 selection made by the user. More specifically, the workstation 102 designates the particular controller 106 that controls the operation of the specific photocopier device 110 selected by the user, assuming that the selected photocopier device 110 meets the "in view" condition for the workstation 102. Alternatively, in the case where the user has selected a photocopier device 110 that does not meet the "in view" condition or has selected several photocopier devices 110, the workstation 102 awaits receipt of a validation message for the user from a controller 106 before designating that particular controller 106 for establishing the temporary cost recovery relationship.

In this variant embodiment of the cost recovery system 100, when a user inputs identification information to a controller 106 via the local display, the respective controller 106 is operative to transmit a validation message (including the user identification information and an identification of the particular photocopier device 110 requested) to the CRS 104, as well as to all of the workstations 102 within the system 100. The controller 106 then waits for instructions from either the CRS 104 or one of the workstations 102 to enable the particular photocopier device 110 for use by the user. In the case where these instructions are received from a workstation 102, the controller 106 enters into a temporary, exclusive communicative relationship with the respective workstation 102, whereby the respective workstation 102 and the controller 106 work together to implement cost recovery for the photocopy/fax/scan job performed by the user on the particular photocopier device 110. In this scenario, when the user completes the photocopy/fax/scan job on the particular photocopier device 110, the controller 106 is operative to transmit the captured photocopy/fax/scan job data back to the respective workstation 102, rather than to the CRS 104.

If the controller 106 receives a "verification failed" message from the CRS 104 as well as from each of the workstations 102, the cost recovery unit 304 of the controller 106 proceeds to implement a local cost recovery function, as described above. Alternatively, rather than implementing a local cost recovery function, the controller 106 will simply display the "verification failed" message to the user via the local display and will maintain the particular photocopier device 110 in the disabled state.

In an alternative example of implementation of this variant embodiment, each workstation 102 is only operative to implement and/or initiate locally the above-described master functions of cost recovery for those particular photocopier devices 110 and/or controllers 106 that meet the "in view" condition for the respective workstation 102. Thus, if a user at a particular workstation 102 selects a photocopier device 110 and/or controller 106 that does not meet the "in view" condition for the particular workstation 102, the particular workstation 102 is operative to pass control to the CRS 104 for negotiating and establishing the cost recovery relationship.

Under this variant embodiment of the cost recovery system 100, the function of generating cost recovery data on a basis of both the authentication information provided by the user to the workstation 102 and the photocopy/fax/scan job data captured by the controller 106 may be implemented by either one of the workstation 102 and the controller 106. In a specific example of implementation, the software residing on each workstation 102 further implements the functionality of generating cost recovery data (as discussed above with regard to the data collection unit 202). Accordingly, in the case where the controller 106 does not generate cost recovery data, the controller 106 simply transmits back to the workstation 102 the captured photocopy/fax/scan job data and it is the workstation 102 that takes care of generating the cost recovery data for the photocopy/fax/scan job performed on the particular photocopier device 110. Alternatively, in the case where the controller 106 is capable to generate cost recovery data (as discussed above regarding the data capture unit 302), the workstation 102 may, in addition to providing instructions to enable the particular photocopier device 110, transmit to the controller 106 the user identification and job description information provided by the user during the authentication process. In this case, the controller 106 will proceed to generate cost recovery data upon completion of the photocopy/scan/fax job and will transmit this cost recovery data back to the workstation 102 for storage in the local cost recovery database.

It is important to note that the various embodiments of the cost recovery system 100 discussed above are not exclusive one from the other. In other words, included within the scope of the present invention is a cost recovery system 100 including different types of controllers 106 and workstations 102 of varying capabilities. Therefore, in a specific example, of the multiple controllers 106 within the cost recovery system 100, only a select few are capable to perform a local cost recovery function. In another example, some of the controllers 106 are embedded within their associated photocopier device(s) 110, while others are external to their associated photocopier device(s) 110. In yet another example, some of the workstations 102 are capable to communicate directly with the controllers 106, while others necessarily communicate via the CRS 104.

Although various embodiments have been illustrated, this was for the purpose of describing, but not limiting, the invention. Various modifications will become apparent to those skilled in the art and are within the scope of this invention, which is defined more particularly by the attached claims.

I claim:

1. A method for generating cost recovery information in connection with a walk-up function performed by a multifunctional photocopier device, the walk-up function requiring at least some physical interaction between a person and the multi-functional photocopier device, said method comprising: a) using a personal computing device to send a usage request over a computer network to a cost recovery server to reserve the multifunctional photocopier device to perform a specific job; b) processing the usage request at the cost recovery server, said processing including: i) authenticating a user associated with the specific personal computing device from which the usage request originated; and ii) establishing a temporary cost recovery relationship between the multifunctional photocopier device and the specific personal computing device at least in part based on authentication results obtained in i), the temporary cost recovery relationship being associated with the specific job to be performed at the multifunctional photocopier device; c) validating the user at the multifunctional photocopier device at least in part based on verification information entered by the user at the multifunctional photocopier device; d) selectively enabling the specific job to be performed at the multifunctional photocopier device at least in part based on validation results obtained in c), wherein performing the specific job results in the generation of job data, the specific job including the use of the walk-up function; e) transmitting to the cost recovery server the job data generated at the multifunctional photocopier device by performing the specific job at step c); f) analyzing usage of the multifunctional photocopier device in connection with the specific job performed at step c) at least in part by processing, at the cost recovery server, the job data to derive cost recovery information associated with the specific job, the cost recovery information being derived at least in part based on the temporary cost recovery relationship established between said multifunctional photocopier device and the specific personal computing device.

2. A method as defined in claim 1, wherein the walk-up function is a scanning function and wherein the job data includes scan job data.

3. A method as defined in claim 1, wherein validating the user at the multifunctional photocopier device includes: a) the user walking up to said multifunctional photocopier device; b) the user providing verification information at the multifunctional photocopier device through an interface associated with the multifunctional photocopier device; c) the multifunctional photocopier device causing a verification operation to be performed at least in part based on the verification information provided by the user and the temporary cost recovery relationship established between the multifunctional photocopier device and the specific personal computing device.

4. A method as defined in claim 1, wherein authenticating the user associated with the specific personal computing device includes processing authentication information associated with the user.

5. A method as defined in claim 1, wherein authenticating the user associated with the specific personal computing device includes causing the user to be prompted to provide authentication information via a user interface on a display of the specific personal computing device.

6. A method as defined in claim 4, wherein the authentication information includes user identification information.

7. A method as defined in claim 6, wherein the authentication information further includes job description information.

8. A method as defined in claim 1, wherein the personal computing device is a smart phone.

9. A cost recovery system for a multifunctional photocopier device performing at least one walk-up function, the walk-up function requiring at least some physical interaction between a person and the multi-functional scanner device, said system comprising: a) an interface for exchanging signals over a computer network with a personal computing device, said signals including a usage request originating from the personal computing device to reserve the multifunctional photocopier device to perform a specific job; b) a cost recovery server being configured for processing the usage request, said processing including: i) authenticating a user associated with the specific personal computing device from which the usage request originated; and ii) establishing a temporary cost recovery relationship between the multifunctional photocopier device and the specific personal computing device at least in part based on authentication results obtained in i), the temporary cost recovery relationship being associated with the specific job to be performed at the multifunctional photocopier device; c) a controller associated with said multifunctional photocopier device, said controller including: i) an interface associated with the multifunctional photocopier device configured for accepting verification information entered by the user at the multifunctional photocopier device; ii) a processor programmed for: (1) validating the user at the multifunctional photocopier device at least in part based on verification information entered by the user at the multifunctional photocopier device; (2) selectively enabling the specific job to be performed at the multifunctional photocopier device at least in part based on validation results obtained in (1), wherein performing the specific job results in the generation of job data, the specific job including the use of the walk-up function; (3) transmitting to the cost recovery server the job data generated at the multifunctional photocopier device by performing the specific job; d) said cost recovery server being configured for analyzing usage of the multifunctional photocopier device in connection with the specific job at least in part by processing the job data received from the controller to derive cost recovery information associated with the specific job, the cost recovery information being derived at least in part based on the temporary cost recovery relationship established between said multifunctional photocopier device and the specific personal computing device.

10. A system as defined in claim 9, wherein the walk-up function is a scanning function and wherein the job data includes scan job data.

11. A system as defined in claim 10, wherein validating the user at the multifunctional photocopier device includes processing the verification information entered by the user at the multifunctional photocopier device at least in part based on the temporary cost recovery relationship established between the multifunctional photocopier device and the specific personal computing device.

12. A system as defined in claim 10, wherein authenticating the user associated with the specific personal computing device includes processing authentication information associated with the user.

13. A system as defined in claim 10, wherein authenticating the user associated with the specific personal computing device includes causing the user to be prompted to provide authentication information via a user interface on a display of the specific personal computing device.

14. A system as defined in claim 13, wherein the authentication information includes user identification information.

15. A system as defined in claim 14, wherein the authentication information further includes job description information.

16. A system as defined in claim 10, wherein the personal computing device is a smart phone.

17. a method for generating cost recovery information in connection with a walk-up function performed by a multifunctional photocopier device, the walk-up function requiring at least some physical interaction between a person and the multi-functional photocopier device, said method comprising: a) using a personal computing device to send a usage request over a computer network to a cost recovery server to reserve the multifunctional photocopier device to perform a specific job; b) processing the usage request at the cost recovery server, said processing including: i) authenticating a user associated with the specific personal computing device from which the usage request originated; and ii) establishing a temporary cost recovery relationship between the multifunctional photocopier device and the specific personal computing device at least in part based on authentication results obtained in i), the temporary cost recovery relationship being associated with the specific job to be performed at the multifunctional photocopier device; c) performing the specific job results in the generation of job data, the specific job including the use of the walk-up function; d) transmitting to the cost recovery server the job data generated at the multifunctional photocopier device by performing the specific job at step c); e) analyzing usage of the multifunctional photocopier device in connection with the specific job performed at step c) at least in part by processing, at the cost recovery server, the job data to derive cost recovery information associated with the specific job, the cost recovery information being derived at least in part based on the temporary cost recovery relationship established between said multifunctional photocopier device and the specific personal computing device.

* * * * *